United States Patent [19]

Hills

[11] Patent Number: 4,513,405
[45] Date of Patent: Apr. 23, 1985

[54] AUTOMOTIVE SOUND SYSTEM

[75] Inventor: Joseph F. Hills, Scottsdale, Ariz.

[73] Assignee: Jimmy's Radio & Television Corp., Phoenix, Ariz.

[21] Appl. No.: 436,575

[22] Filed: Oct. 25, 1982

[51] Int. Cl.³ .............................................. H04B 1/20
[52] U.S. Cl. ...................................... 369/12; 455/347
[58] Field of Search ...................... 369/2, 6, 7, 10, 12; 455/345, 347, 348, 349; 381/86; 312/7.1, 242; 179/178, 179

[56] References Cited

U.S. PATENT DOCUMENTS 3,906,371 9/1975 Tsuji .................................... 455/347

Primary Examiner—Donald McElheny, Jr.
Attorney, Agent, or Firm—Cahill, Sutton & Thomas

[57] ABSTRACT

A standardized chassis for installation of a sound system in an automobile is adapted to receive a component selected from one or more of several groups of components to permit variations in complexity and quality of the composite automotive sound system commensurate with the desires of a user. A face plate, selected from a group of face plates and conforming with the requirements of the components selected, is attachable to the chassis and provides an aesthetically pleasing appearance. The chassis and components include wiring harnesses interconnectable with one or another to eliminate all chassis external leads other than leads for the antenna, electrical power and speakers.

16 Claims, 5 Drawing Figures

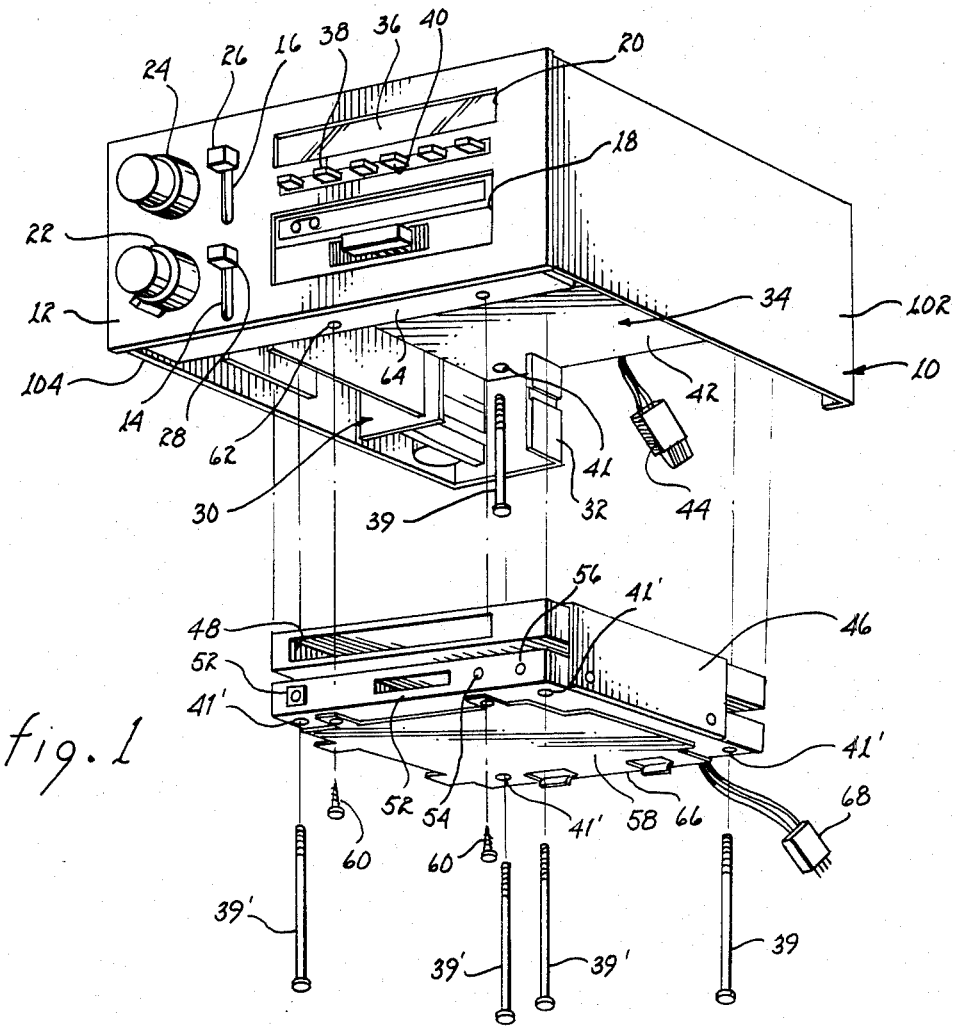
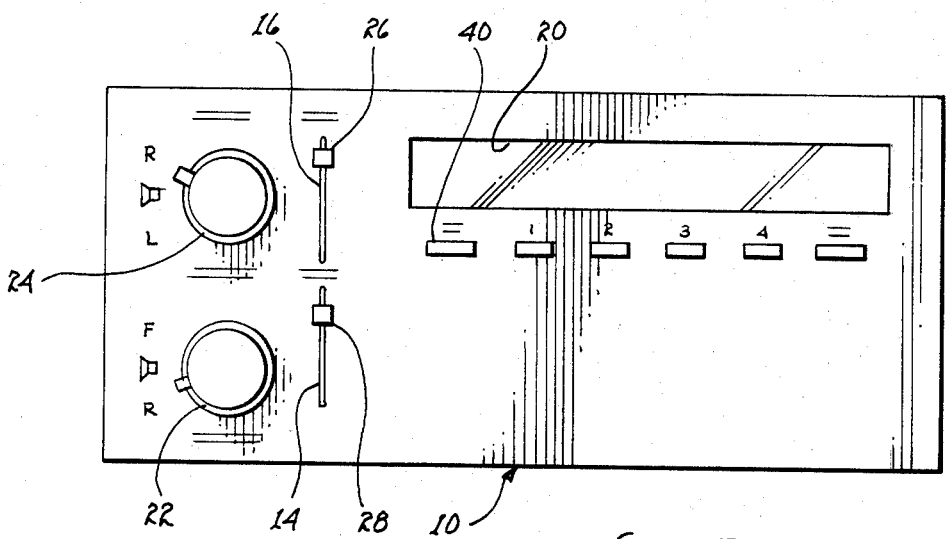

AUTOMOTIVE SOUND SYSTEM

The present invention relates to automotive sound systems and, more particularly, to a sound system which permits facile interchangeability of major components to modify the quality and complexity of the electrical signal generating source representative of the sound to be emitted by associated speakers.

The dashboards of most automobiles include accommodation for a cavity there behind within which a simple radio or more complex sound system may be installed; a commensurately configured opening is formed in the dashboard to accommodate the controls and other manually adjustable related elements. After an original equipment sound system selected by the automobile dealer is installed, many automobile owners elect to upgrade or add to the sound system initially installed at some point in time after the automobile is purchased. This result can be accomplished in one of two ways. The dealer or a radio shop servicing the dealer removes the original unit and installs a replacement. Alternatively, the owner may go to an after market radio dealer for replacement of the original unit. In either case, the removed unit usually is treated as scrap and the owner receives little credit toward purchase of the replacement unit. Thus, the owner suffers an unnecessary financial loss since the unit does have inherent value. Moreover, new car dealerships somewhat arbitrarily select a sound system for cars they order, which sound system may or may not be compatible with the desires of the ultimate purchaser. If the purchaser wishes a different sound system ab initio, of higher or lower quality, the dealer must effect a replacement and charge the purchaser only for the difference in cost. The removed unit is usually shipped back to the automobile manufacturer who may scrap it or dispose of it at far below its intrinsic value. The expenses associated with the cost and subsequent disposal of the original unit are generally borne by the automobile manufacturer and represents millions of dollars per year.

After market upgrading of automotive sound systems often entails locating the various added electrical signal generating components beneath the dash, under the seats or in the trunk since space therefor after is not available in the dashboard. Such distribution of components necessitates the laying of wiring in and about the automobile and incurs unnecessary labor costs. The wiring, if not electrically shielded, may become inductively or capacitively coupled with spurious electrical signal sources of the automobile itself and result in degradation of the sound quality. Moreover, having such components variously distributed about the automobile requires unnecessary attention to operate the sound system and impairs concentration upon the driving of the automobile.

With the presently existing accelerated growth of the small sized automobile market, greater and greater space constraints in the dashboard have and will come into being. This trend, coupled with an increasing demand for sophisticated and elaborate sound systems, tends to exacerbate the above noted problems.

The structural features of the automobile sound generating system described herein are directed to the use of a standardized chassis within which may be mounted selected components from several families of components. Such selection permits the user to initially or subsequently customize and modify both the quality and complexity of his automobile sound system at a relatively modest cost and eliminates the need for locating the selected components in and about the automobile. Moreover, any modifications to be made can be made directly at a dealership, an authorized service facility or by the user himself by adding, deleting or substituting off the shelf components within the chassis. All component interconnecting wiring is maintained within the chassis to eliminate labor costs associated with laying the wiring about the automobile and to electrically shield the wiring from spurious electrical signal sources. The present costs to the automobile manufacturer attendant scrapping replace sound systems are avoided since any removed components of the original sound system can be retained by the dealer for subsequent retail or wholesale sales and the user need purchase only the additional or replacement component he desires.

It is therefore a primary object of the present invention to provide an automobile sound system having exchangeable components mounted within a standardized chassis.

Another object of the present invention is to provide an automotive sound system which is modifiable to accommodate selection by a user from a variety of components to conform with a certain quality and complexity.

Yet another object of the present invention is to provide an automobile sound system having variously configured face plates to conform with a range of components mountable within a standardized chassis.

Still another object of the present invention is to provide an automotive sound system which is modifiable to meet present and future needs of the user.

A further object of the present invention is to provide a single chassis contained sound system which is adaptable to a different configuration at a cost of the added or replaced components only.

A yet further object of the present invention is to provide a configuration of an automotive sound system as original equipment which eliminates the need to return to the manufacturer a dealer installed but customer rejected sound system.

A still further object of the present invention is to provide a unitary automobile sound system which can be modified by substitution of components to any selected range of quality and electrical signal generating elements and which is mountable within a predetermined location in the dashboard of an automobile.

These and other objects of the present invention will become apparent to those skilled in the art as the description thereof proceeds.

The present invention will be described with greater specificity and clarity with reference to the following drawings, in which:

FIG. 1 is a partial isometric view illustrating addition of a component within a chassis;

FIG. 2 illustrates a replacement face plate compatible with the components mounted within a standardized chassis;

Figure 3:
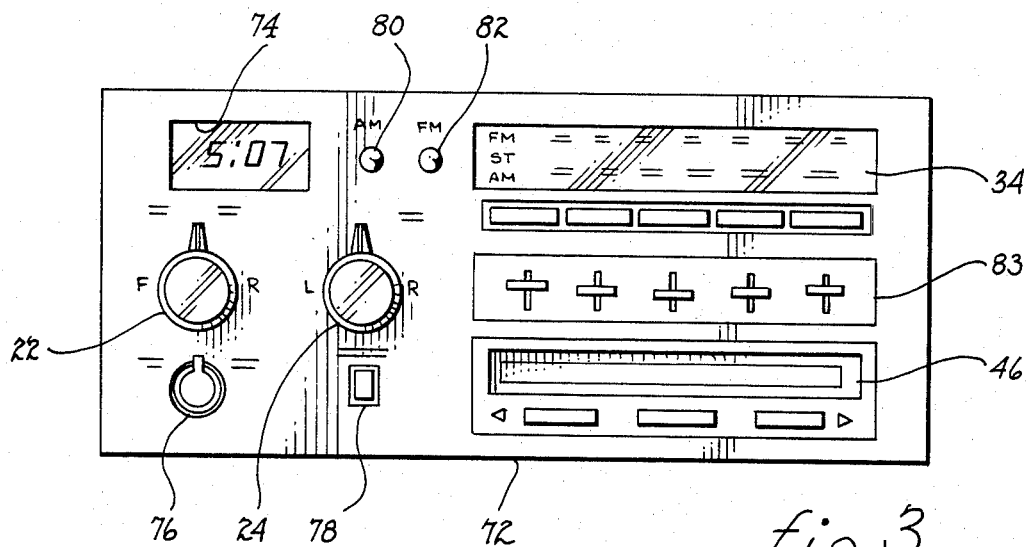
FIG. 3 illustrates a further face plate variant.

Referring to FIG. 1, there is shown a chassis 10 for housing various electrical signal generating components attendant a sound system for an automobile. The chassis is standardized in size, configuration and mounting means for attaching it behind an automobile dashboard in concert with an attendant aperture in the dashboard. A face plate 12 is detachably attachable to the front of the chassis to serve as a decorative cover therefor and to comport with the overall ornamental and aesthetic configuration of the dashboard. The face plate includes a plurality of apertures, such as apertures 14, 16, 18 and 20, to accommodate protruding control functions and displays of the components housed within the chassis. Preferably, the face plate is attachable to the chassis independent of the mounting means for securing the chassis to the dashboard. Such independent mounting permits manufacture of the face plate of low cost plastics and eliminates the need for constructing the face plate sufficiently rigid and robust to provide mechanical support for the chassis. Moreover, by employing snap fittings to attach the face plate, removal thereof is readily accomplished after disengagement of manipulatable knobs, such as knobs 22, 24, 26 and 28, secured upon the elements protruding from components within the chassis.

The layout of the components within the chassis may take any one of several possible configurations. In the embodiment illustrated in FIG. 1, one of the electrical signal generating components, amplifier 30, is lodged along the lefthand side of the chassis. Such location permits the various controls corresponding therewith to be conveniently grouped for the user on the lefthand side of the face plate. Moreover, the remainder of chassis cavity 32 is left unobstructed to receive one or more further electrical signal generating components which produce electrical signals to be amplified by amplifier 30.

Presently, a large segment of automobile owners enjoy listening to radio stations transmitting in the FM band, as well as to the AM broadcast stations. Accordingly, a radio frequency tuner 34 having the capability of tuning in broadcast stations in either the AM or FM band is illustrated in FIG. 1. The tuner includes a visual display 36 viewable through aperture 20 in the face plate. Additionally, the tuner may have a plurality of push buttons 38 for radio station selection, local and distant station sensitivity selectors and other function selectors. These push buttons or selections protrude through correspondingly located apertures 40 in face plate 12.

Tuner 34 is self-contained in the sense that all components necessary for its function are built and contained within a protective envelope 42 encircling display 36 and from which push button 38 protrudes. With such construction, the unit will withstand normal and even abusive handling without serious problem of damage to the internal elements. An electrical harness 44 extends from envelope 42 to permit electrical interconnection between the tuner and amplifier 30. Furthermore, envelope 42 includes means, such as bolt 39 extending through hole 41 for threaded engagement with the top of the chassis, for securing the tuner rigidly within a predetermined location in chassis 10.

Tape players, of the 8-track and cassette types, have become very popular in the last few years and a strong demand exists for buying sound systems incorporating such tape players or upgrading existing sound systems to obtain this capability. Cavity 32 within chassis 10 is configured large enough to accommodate both tuner 34 and tape player 46, another electrical signal generating component. The tape player includes a recess 48 within which a tape to be played is removeably inserted. Additionally, various control functions, such as eject, fast forward/rewind, track selection and on/off indicator represented by numerals 50, 52, 54 and 56, respectively, may be present. These functions are available through aperture 18 in face plate 12 by suitably attached knobs, levers and lenses.

Tape player 46 is located within cavity 32 in stacked relationship to tuner 34. The means for securing the tape player may be by attachment directly to the tuner, by attachment to the chassis independent of the tuner or by means securing the tuner and tape player to one another as well as to the chassis; the latter is illustrated by bolts 39' extending through apertures 41' in the tape player, through corresponding apertures 41 in the tuner and threadedly engaging the top of the chassis. The selection of the securing means is primarily dictated by manufacturing considerations and ease of use in the field.

An electrical harness 68 extends from tape player 46 for electrically connecting the tape player directly with amplifier 30 or to a junction box within the chassis.

A cover plate 58 is attached to the bottom of chassis 10 by sheet metal screws, such as screws 60 engaging corresponding apertures 62 in a bottom flange 64 of the chassis. Rear edge 66 of the cover plate may be mechanically interlocked with the chassis or screws, like screw 60 may be employed. The cover plate serves the function of providing access to cavity 32 for addition deletion or replacement of the components within the chassis and to protect the components enclosed therein. Moreover, tape player 46 may be directly secured to the cover plate as an alternative to the above described means for securing it.

Referring to FIG. 2, there is shown a further face plate 70. It may be noted that this face plate is like that shown in FIG. 1, except that the apertures attendant the tape player have been omitted. Thus, face plate 70 would be employed with chassis 10 in the event the ultimate user elected not to include tape player 46. The resulting blank space may be ornamented with wording or design to render it less obvious that a component which could be included has not been included.

In the event a user obtained an automobile having a sound system which included only amplifier 30 and tuner 34 mounted within chassis 10, face plate 70 would be employed. Either ab initio or at some future date, the user could expand the sound system by adding tape player 46, as described with respect to FIG. 1. Upon such addition, face plate 70 would be replaced with face plate 12. Upon such modification, it becomes apparent that the user would not suffer the financial loss of discarding a useable sound system and paying for another sound system having greater capability. Instead, the user would simply purchase a tape player 46 at a relatively modest cost and, install it himself, have it installed by the automobile dealership or an independent facility. Not only is the cost savings to the user substantial but the handling problems and expense of return to the manufacturer of the original unit are completely eliminated.

FIG. 3 illustrates a further face plate 72 useable in conjunction with a sound system having a tape player 46, a tuner 34, an amplifier of which only corresponding knobs 22, 24 are shown, a clock display 74, various further knobs, push buttons or levers, such as represented by elements 76, 78 and indicators 80, 82 may be incorporated for various functions. In addition to these components, further components, such as a sound equalizer, represented by numeral 83, may be incorporated. This capability may become of particular importance as equalizers are used to tune the sound emitted from the attendant loud speakers with the sound chamber represented by the interior of the automobile.

Figure 4:
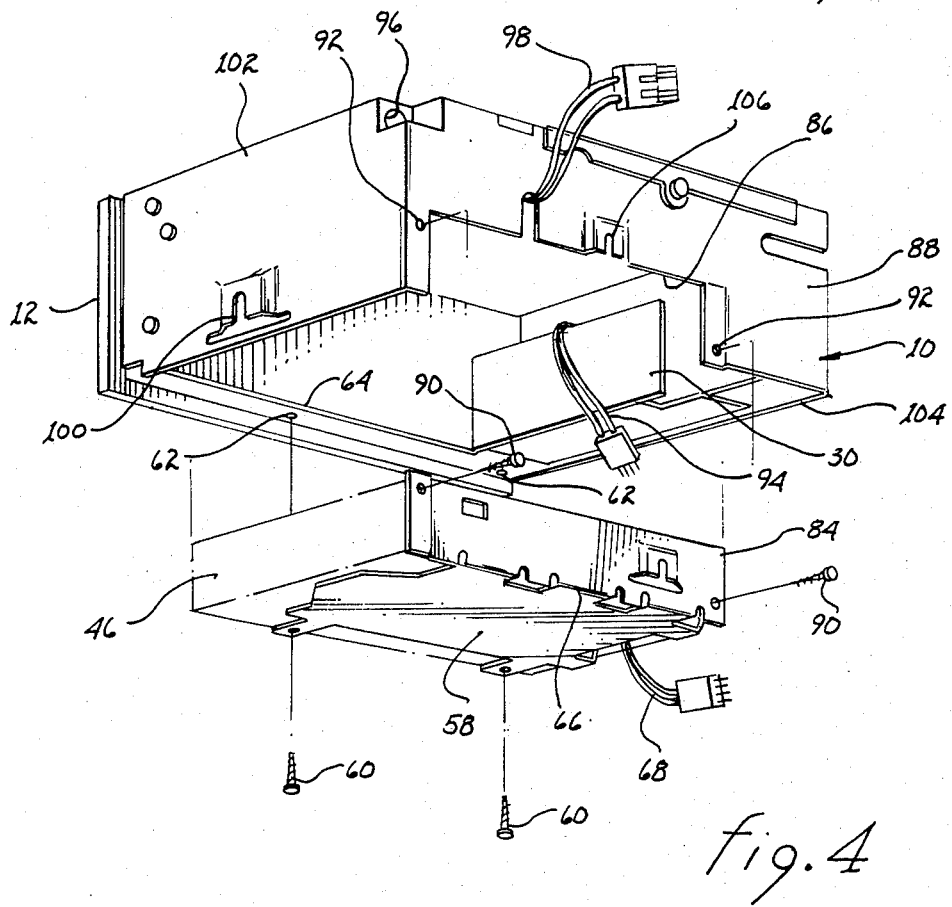
FIG. 4 is a partial isometric view of adding a component within a chassis.

FIG. 4 is a rear view of chassis 10 to illustrate certain features not visible in FIG. 1. In example, cover plate 58 may include a rear side wall 84 extending from edge 66 and conforming with indentation 86 of rear side 90 of the chassis, which indentation is made to provide better access to the interior of the chassis. Further sheet metal screws 90 extend through side wall 84 to engage apertures 92 and secure the side wall to the rear side. Electrical harness 94, extending from amplifier 30 for electrical attachment to a junction box on the chassis or other components mounted within the chassis is disclosed.

Female connector 96 may be employed to receive and electrically interconnect with the lead from an antenna to provide a signal for the tuner, when used. The only external electrical harness employed in conjunction with the sound system is harness 98. This harness serves to interconnect the sound system with the source of electrical power, the automobile battery. Means, such as brackets 100 disposed on opposed sides 102, 104 of the chassis and bracket 106 disposed on rear side 88 may be employed to secure the chassis to dashboard supporting structure or other fixed structure to secure the chassis in place and the need for employing face plate 12 as part of the chassis mounting mechanism may be eliminated.

From the above description of the electrical interconnection between the components of the sound system, it will become apparent that no interconnecting wires external to the chassis are used. Thereby, several advantages are obtained. First, the electrical harnesses are shielded from spurious electrical radiation and introduction of sound degrading signals through inductive or capacitive coupling is eliminated. Second, removal and installation of the sound system is substantially simplified since it need only be connected to the source of electrical power and antenna lead. Third, the potential of injury to the interconnecting wiring during handling of the chassis is eliminated.

Figure 5:
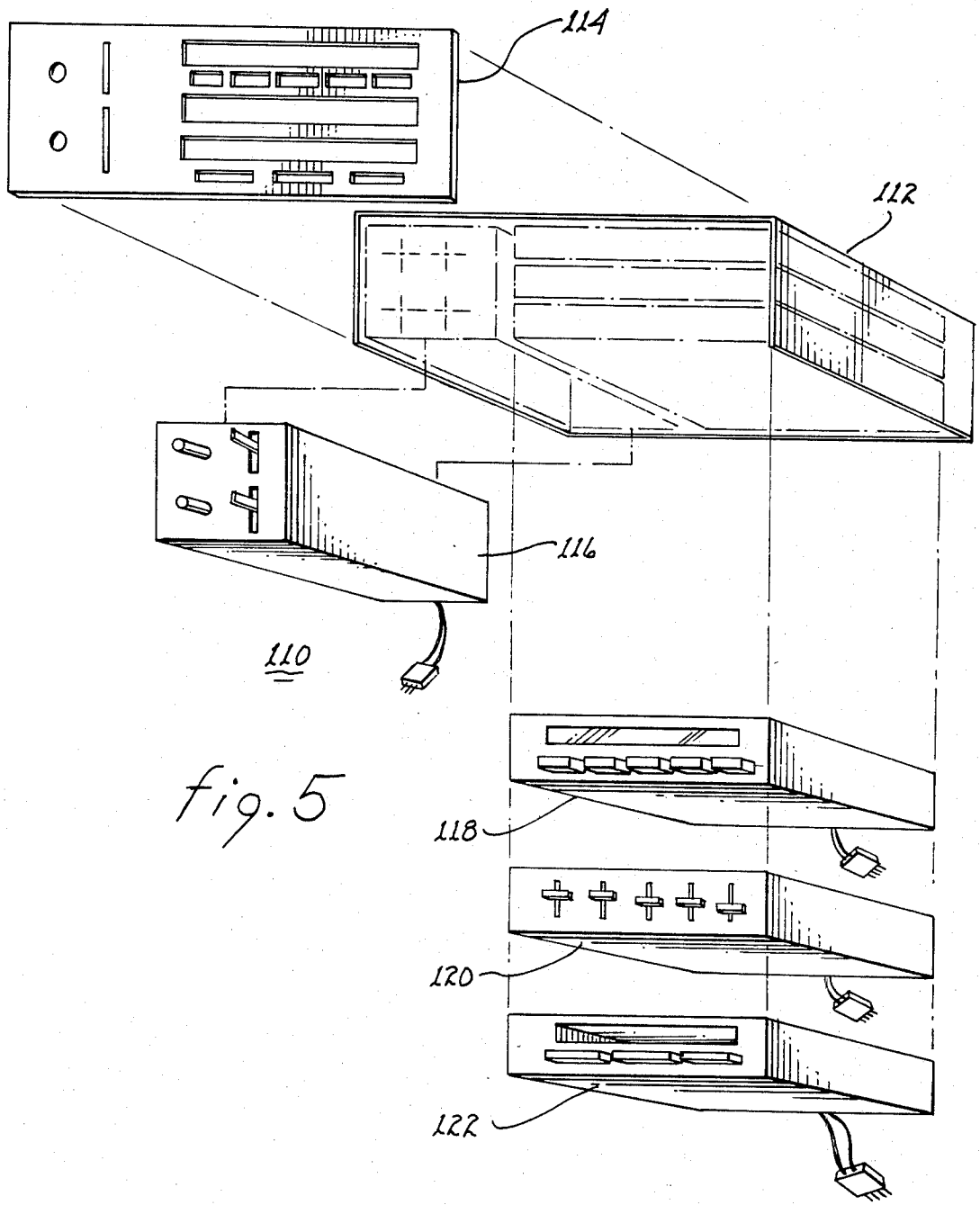
FIG. 5 is an isometric view illustrating mounting of a variety of selected components within a standardized chassis.

Referring to FIG. 5, there is shown an isometric view of a sound system 110 having six discrete self-contained components: chassis 112, face plate 114, amplifier 116, tuner 118, equalizer 120 and tape player 122. Each of these components is independently replaceable and all of the electrical components are electrically interconnectable within chassis 112 through corresponding electrical harnesses. Any of the components may be independently replaced by a duplicate component if defective. Amplifier 116 may be replaced with another of higher or lower quality or different capability. Any of tuner 118, equalizer 120 or tape player 122 may be eliminated or replaced with one of different quality or complexity. Or, chassis 112 may be replaced if damaged or otherwise defective. Any change of amplifier, tuner, equalizer or tape player may necessitate replacement of face plate 114 to render it compatible with the protruding elements or visual indicators attendant an added, deleted or replaced signal generating component.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A sound system for use in automobile dashboards which permits ab initio or subsequent selection of quality and complexity of electrical signal production through post manufacture addition, deletion or interchange of elements, said sound system comprising in combination:

(a) a chassis standardized in configuration and complying in size with the requirements and parameters attendant the dashboard of an automobile, said chassis including standardized mounting means for mounting said chassis without adaptation or modification in any of a plurality of automobiles having equivalent dashboard apertures;
   (b) a plurality of discrete segregable electrical signal generating components secured within said chassis;
   (c) means for in field adding, deleting and interchanging selected ones of said electrical signal generating components within said chassis;
   (d) means for electrically interconnecting within said chassis said electrical signal generating components; and
   (e) a replaceable face plate for said chassis, said face plate being selectable from a group of equal sized face plates to be congruent with the components mounted within said chassis and comport with the dashboard aperture.

2. The sound system as set forth in claim 1 wherein said adding, deleting and interchanging means comprises a removeable cover plate for providing access to the interior of said chassis and means for removably securing said electrical signal generating components.

3. The sound system as set forth in claim 2 wherein said electrical signal generating components include RF tuners.

4. The sound system as set forth in claim 3 wherein said electrical signal generating components include tape players.

5. The sound system as set forth in claim 4 wherein said electrical signal generating components include an amplifier.

6. The sound system as set forth in claim 5 wherein said electrical signal generating components include equalizers.

7. The sound system as set forth in claim 1 wherein said electrical signal generating components include a RF tuner, tape player and amplifier.

8. The sound system as set forth in claim 7 wherein said adding, deleting and interchanging means comprises means for stacking said tape player and RF tuner at a predetermined location within said chassis.

9. The sound system as set forth in claim 8 wherein said amplifier is located alongside said stacked tape player and RF tuner.

10. The sound system as set forth in claim 1 wherein said face plate includes apertures congruent with the location and size of control elements protruding external to said chassis from said electrical signal generating components.

11. The sound system as set forth in claim 10 wherein said mounting means is independent of said face plate.

12. The sound system as set forth in claim 1 wherein said interconnecting means comprises an electrical harness associated with each one of said electrical signal generating components.

13. A method for altering ab initio or in the field the quality and complexity of electrical signals generated by a dashboard mounted sound reproduction system for automobiles, said method comprising the steps of:
    (a) modifying the composition of the discrete electrical signal generating components attached within a chassis;
    (b) said step of modifying including selected ones of the steps of adding, deleting and interchanging one or more of the electrical signal generating components;
    (c) electrically interconnecting within the chassis the electrical signal generating components attached to the chassis;
    (d) removeably mounting the chassis to the dashboard structure independent of the face plate for the chassis; and
    (e) replacing the face plate with a further face plate which is congruent with the requirements of the altered composition of electrical signal generating components attached to the chassis.

14. The method as set forth in claim 13 including the step of removing the chassis from the dashboard of the automobile.

15. The method as set forth in claim 13 including the step of installing the chassis in the dashboard of the automobile.

16. The method as set forth in claim 13 including the steps of removing the original chassis from the dashboard and reinstalling the modified chassis in the dashboard.

* * * * *